Oct. 13, 1936.   LE BARON W. KINNEY, JR   2,057,034
LIQUID MEASURING APPARATUS
Filed July 30, 1935
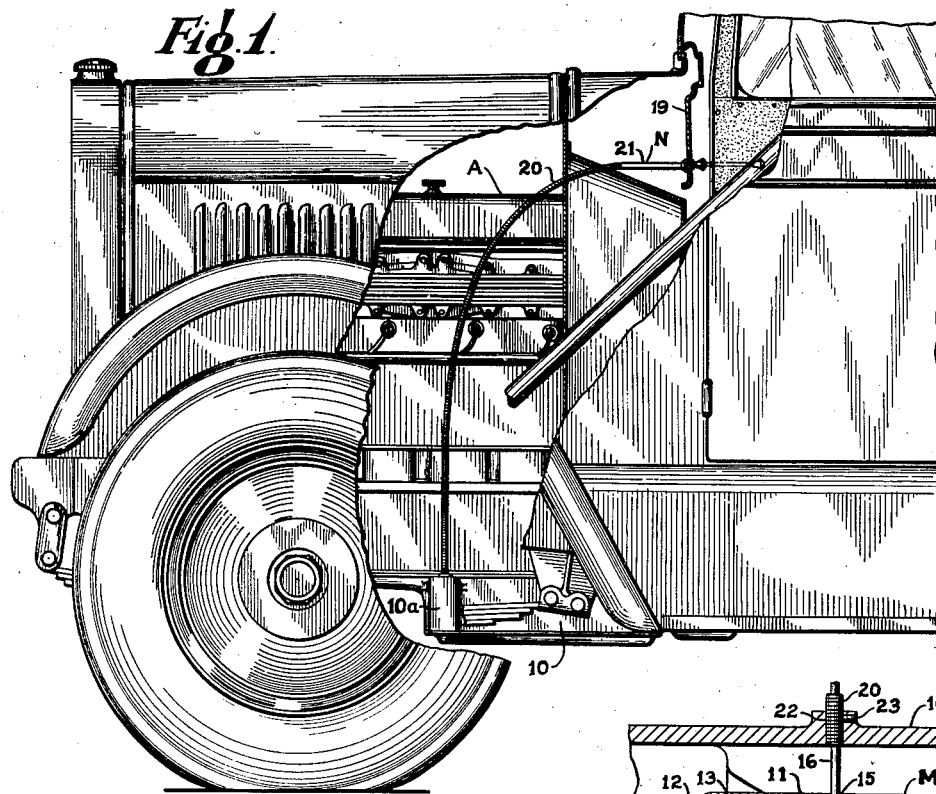
Fig.1.
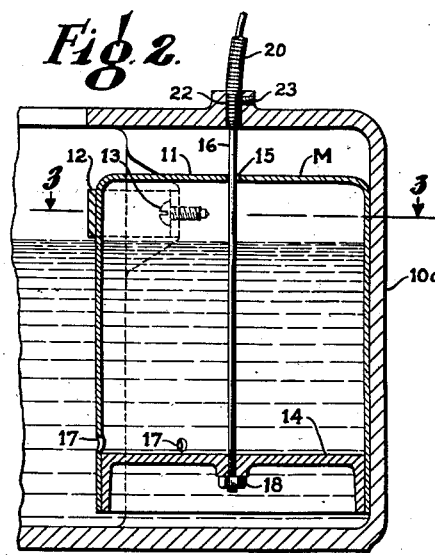
Fig.2.
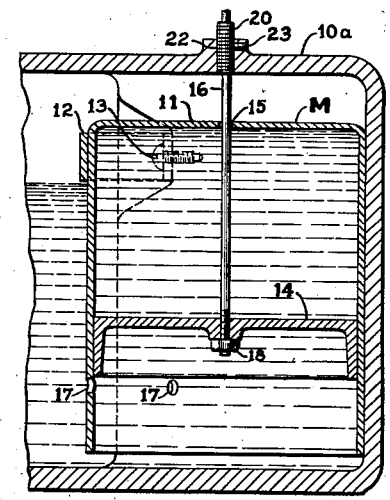
Fig.3.
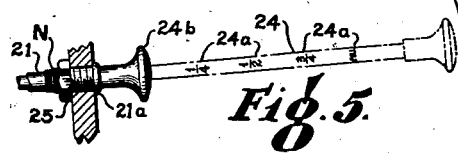
Fig.5.
Fig.4.
INVENTOR.
LeBaron W. Kinney Jr.
R.M. Cooper
ATTORNEY.

Patented Oct. 13, 1936

2,057,034

UNITED STATES PATENT OFFICE 2,057,034

LIQUID MEASURING APPARATUS

Le Baron W. Kinney, Jr., Cleveland, Ohio, assignor to The White Motor Company, Cleveland, Ohio, a corporation of Ohio Application July 30, 1935, Serial No. 33,920

1 Claim. (Cl. 73—120)

This invention relates to liquid measuring apparatus, and more particularly to apparatus for measuring the oil in internal combustion engines.

One object of the invention is to provide a simple efficient apparatus for measuring the oil in an engine of the type defined.

A further object of the invention is to provide an apparatus as above set forth which includes means for measuring the oil from a remote point.

Other objects will appear in the following description of one practical embodiment of my invention illustrated in the accompanying drawing, in which:

Figure 1 is a fragmentary side elevation of an automobile equipped with an oil measuring apparatus embodying the present invention, certain parts being broken away in the interest of clarity.

Figure 2 is a cross sectional view of the lower portion of the engine taken through the lower part of the oil measuring apparatus, the view showing the normal relation of the parts of the oil measuring apparatus.

Figure 3 is a view similar to Figure 2 illustrating the position taken by the parts of the oil measuring apparatus in measuring the oil.

Figure 4 is a cross sectional view taken on line 3—3 of Figure 2, and

Figure 5 is an enlarged fragmentary view of the oil measuring apparatus associated with the dash, and illustrating in dot and dash lines the position of the plunger when fully withdrawn.

Referring to the drawing, the automobile shown therein comprises an engine A constructed in the usual manner with a crankcase 10 located below the engine cylinders and serving as a lubricant reservoir. Mounted in an outwardly protruding portion 10a of the crankcase 10 there is a mechanism M which forms part of an apparatus for measuring the oil in the crankcase, such mechanism comprising a cup-shaped member 11 secured in inverted position within the portion 10a by a metal strap 12 and screws 13, and a piston 14 reciprocally mounted within the member 11.

The member 11 is so constructed and mounted that its lower end extends in close proximity to the bottom of the crankcase, and its upper end above the level attained by the oil in the crankcase when full. The upper wall of such member is formed with an aperture 15 which receives a wire 16 for operating the piston 14, and the inner side wall of such member with a plurality of apertures 17 located adjacent the bottom of such member which serve as communicating passages between the interior of the member 11 and the reservoir in the crankcase when the piston 14 is at the lower end of its stroke.

The aperture 15 is constructed with a larger diameter than the wire 16, being of such size that the passageway afforded thereby fulfills the following functions:

(1) Provides a communication between the interior of the member 11 and the crankcase, resulting in the maintenance of substantially equal pressures within such parts when the engine is running.

(2) Allows the escape of air from the interior of the member 11 into the crankcase when the piston 14 is raised in measuring the oil as hereinafter described, without producing much resistance to upward movement of the piston.

(3) Acts, following the exhaustion of the air from the member 11 in measuring the oil, to restrict and resist the flow of oil out of such member in a manner to produce a strong resistance to upward movement of the piston.

In order to achieve the results mentioned in the preceding sub-paragraphs 1, 2 and 3, it is necessary to construct the member 11 with a large internal diameter so that the aperture 15 acts greatly to restrict the flow out of the member 11. By so doing, it is possible to take advantage of the differences in density and viscosity of air and oil respectively, to achieve the result of a strong resistance to upward movement of the piston following exhaustion of the air from the member 11, while retaining the other functions of the aperture 15.

The provision for maintaining equalized pressure within the interior of the member 11 and the crankcase 10 is made with the purpose of allowing accurate measurement of the oil when the engine is running. Unless such provision is made, the fluctuation of pressures produced in the crankcase by reciprocation of the engine pistons will cause a fluctuation in the heighth of the oil in the member 11 with the result that it will be impossible to obtain an accurate measurement of the oil in the crankcase.

The piston 14 is screwed onto the lower end of the wire 16 and locked into place by a nut 18 and is connected by means of such wire with an operating mechanism N mounted on the dash 19 of the automobile. Between the portion 10a of the crankcase 10 and the mechanism N, the wire 16 is enclosed by a hollow cable 20 designed to prevent flexure thereof during transmission of movement. Such cable is secured at its upper end to the casing 21 of the mechanism N and has its lower end secured within an aperture 22 in the upper wall of the portion 10a of the crankcase by means of a screw 23.

The mechanism N consists in addition to the casing 21 of a plunger 24 reciprocally mounted within such part and marked with oil measuring marks 24a arranged to indicate the amount of oil in the crankcase when the plunger is withdrawn as hereafter described. The casing member 21 is secured upon the dash 19 by means of a flange 21a and a nut 25 and supports the plunger 24 in an inclined position with the head 24b of the plunger 24 protruding into the driver's compartment. The plunger 24 is connected to the upper end of the wire 16 and through such wire to the piston 14, the arrangement being such that when the plunger 24 occupies the position shown in full lines in Figures 1 and 5, the piston 14 is at the bottom of the member 11 as shown in Figure 2.

With the piston in the position last referred to, the reservoir in the crankcase is in communication with the interior of the member 11 through the apertures 17 and the level of the oil in the member 11 is maintained equal to the level in the crankcase. To measure the oil in the crankcase, the plunger 24 is pulled outward from the piston shown in full lines in Figures 1 and 5, until a strong resistance to further movement is felt, following which the amount of oil in the crankcase is read on the plunger 24 with the flange 21a of the casing 21 serving as an index.

As the plunger 24 is withdrawn during the measuring operation, the piston 14 is raised within the member 11, the initial upward movement of the piston acting to close the apertures 17 in the side walls of the member 11. Following the initial movement of the piston 14, the oil in the member 11 is lifted by the piston 14 forcing the air above the oil into the crankcase by way of the aperture 15. The air above the oil passes freely through the passage afforded by the aperture 15 as the piston is raised, and no great resistance to outward movement of the plunger 24 is felt until the point is reached at which the oil in the member 11 engages the top of such member, and further upward movement of the piston tends to force oil through the passage afforded by the aperture 15. At this point, the pull on the plunger 24 is released and the reading taken thereon as above described.

After measurement of the oil, the plunger 24 is returned to its original position moving the piston 14 downward to the bottom of the member 11. During this operation, air enters the member 11 by way of the passage afforded by the aperture 15 effecting an equalization of the pressures within such member and the crankcase at the termination of the movement.

Although the foregoing description is necessarily of a detailed character, in order that the invention may be completely set forth, it is to be understood that the specific terminology is not intended to be restrictive or confining and that various rearrangements of parts and structural details may be resorted to without departing from the scope or spirit of the invention as herein claimed.

I claim as my invention:

An oil level indicator comprising the combination for use with an oil container, a hollow construction intended to be located in said container and having its lower end open and near the bottom of the oil container and provided with an aperture in its upper end which is located above the desired oil level in said container, a piston slidably mounted in said hollow construction arranged to reciprocate between the top and the bottom of said construction, a communicating lateral passage being provided between the lower end of said construction and the oil container adapted to be closed by said piston upon initial upward movement of said piston, the aperture in the upper end of said construction allowing a free escape of air but acting to impede the escape of oil, and of such restricted size with respect to the size of the hollow construction as to resist the flow of oil out of said construction and to cause a perceptible resistance to upward movement of said piston, and means for reciprocating said piston, including a member exteriorly of said container and marked with measuring indicia.

LE BARON W. KINNEY, Jr.